Patented Dec. 9, 1941

2,265,639

UNITED STATES PATENT OFFICE 2,265,639

PRINTING INK

Don B. Forman, Fairlawn, Ohio, assignor to The B. F. Goodrich Company, New York, N. Y., a corporation of New York No Drawing. Application April 15, 1938, Serial No. 202,276

3 Claims. (Cl. 260—734)

This invention relates to the art of printing ink manufacture, and more particularly to an improved printing ink.

For many types of printing, inks having a rapid drying rate, commonly called lacquer type inks, are desired. These inks have ordinarily contained cellulosic materials as a base, and have often exhibited poor acid, alkali, and oil resistance and have adhered poorly to many materials such as rubber and parchment paper.

It is an object of this invention, therefore, to provide printing inks having improved adhesion and improved resistance to deterioration. Another object is to provide an ink which can be used on wrappers for soap, butter, and other materials which often prove harmful to cellulosic inks. It is a further object to provide printing inks whose drying time can be varied at will from a few minutes to a day or longer. Still another object is to provide an ink which possesses superior resistance to smearing. These and other objects will appear from the following description of the invention.

The invention consists broadly in the production of printing inks having a vehicle comprising a thermoprene and a drying liquid. Thermoprenes are well known thermoplastic unsaturated hydrocarbons isomeric with and having less chemical unsaturation than rubber. They are made, in general, by treating rubber in solution or in a plastic state with a sulfonic acid, a sulfonyl chloride, a halide of an amphoteric metal, an amphoteric metal salt of a sulfonic acid, a dialkyl sulfate, sulfuric acid, or other isomerizing agent for rubber, the properties of the thermoprene differing somewhat according to the method by which they are prepared. As an example of suitable thermoprenes, I will mention those shown in U. S. Patent No. 1,605,180, granted to Harry L. Fisher, particularly those prepared with aromatic sulfonic acids, though any other thermoprenes may be used if desired. The term "drying liquid" is herein used to signify a liquid which hardens by chemical change rather than, as in the case of a thermoprene solution, by evaporation of the solvent. The drying liquid may accordingly be any drying or semi-drying oil such as linseed oil, tung oil, etc., or other material which hardens in the same manner such as lithographic varnish or the heat-liquefied-rubber vehicles disclosed in the U. S. patent application Serial No. 54,087 filed December 12, 1935 by Richard A. Crawford.

Besides the thermoprene and the drying liquid, the inks contain solvents which evaporate after the ink is applied, the particular solvent employed depending upon the drying time desired. Suitable solvents include kerosene, turpentine, benzene, toluene, dipentene, heptane, etc. Included in the inks may also be the conventional ink pigments, waxes, commercial ink reducers, driers, etc.

The inks may be prepared by the conventional methods well known in the art. The ingredients may be mixed or milled into the thermoprene prior to dissolving in the chosen solvent mixed with the drying vehicle. If desired, the thermoprene may first be dissolved in the solvent, and the other ingredients may be incorporated in an ink mill.

As specific embodiments of my invention, I will show the production of inks containing a thermoprene prepared by following the method of Example 2 of the aforementioned Patent No. 1,605,180 and various drying liquids and solvents.

*Example 1*

A thermoprene solution was prepared containing 800 grams of thermoprene, prepared by isomerizing rubber with p-phenol sulfonic acid, per gallon of kerosene. The following printing ink was then prepared:

| | Parts by weight |
|---|---|
| Thermoprene solution | 51 |
| Tung oil | 17 |
| Ink black | 10 |
| Alkali blue toner | 10 |
| Dammar gum | 2 |
| Carnauba wax | 2 |
| Lead oleate | 2 |
| Cobalt oleate | 1 |
| Petrolatum | 2 |
| Modified phenolic resin | 3 |
| | 100 |

This product was a black ink which was very useful in labeling hose. It set in five minutes at room temperature, and dried in four hours, adhering very firmly to the rubber.

Example 2

An ink which was useful in labeling rubber mechanical goods was prepared containing a thermoprene solution like that in Example 1.

| | Parts by weight |
|---|---|
| Thermoprene solution | 59.7 |
| Tung oil | 7.5 |
| Ink black | 11.2 |
| Alkali blue toner | 11.2 |
| Dammar gum | 2.2 |
| Carnauba wax | 2.2 |
| Cobalt oleate | 1.5 |
| Petrolatum | 1.5 |
| Modified phenolic resin | 3.0 |
| | 100.0 |

Example 3

Another ink useful in labeling rubber mechanical goods contained as the drying agent liquid a mixture of heat-liquefied rubber and a drying oil. A thermoprene solution like that in Example 1 was used.

| | Parts by weight |
|---|---|
| Thermoprene solution | 42.8 |
| Tung oil | 11.8 |
| Heat-liquefied rubber | 11.8 |
| Ink black | 10.7 |
| Alkali blue toner | 10.7 |
| Dammar gum | 2.1 |
| Carnauba wax | 2.1 |
| Lead oleate | 1.6 |
| Cobalt oleate | 3.2 |
| Petrolatum | 1.1 |
| Modified phenolic resin | 2.1 |
| | 100.0 |

Example 4

To label leather goods, an ink was prepared containing a thermoprene solution containing 800 grams of thermoprene, prepared by isomerizing rubber with p-phenol sulfonic acid, per gallon of heptane.

| | Parts by weight |
|---|---|
| Thermoprene solution | 32 |
| Tung oil | 32 |
| Ink black | 11 |
| Alkali blue toner | 11 |
| Lead oleate | 6 |
| Cobalt oleate | 2 |
| Petrolatum | 2 |
| Modified phenolic resin | 4 |
| | 100 |

It is obvious that by varying the proportion of thermoprene, which dries by evaporation of the solvent, to drying liquid which dries by chemical change, and by changing the solvent, inks having any desired rate of drying may be produced.

I claim:

1. Printing ink having a vehicle comprising a thermoprene and heat-liquefied rubber.

2. Printing ink having a vehicle comprising thermoprene prepared by isomerizing rubber with an aromatic sulfonic acid and heat-liquefied rubber.

3. Printing ink having a vehicle comprising thermoprene prepared by isomerizing rubber with p-phenol sulfonic acid and heat-liquefied rubber.

DON B. FORMAN.